United States Patent
Perumal et al.

(10) Patent No.: US 11,827,749 B2
(45) Date of Patent: Nov. 28, 2023

(54) COLORLESS TRANSPARENT COPOLYAMIDE-IMIDE FILMS WITH HIGH MODULUS AND LOW COEFFICIENT OF THERMAL EXPANSION AND PREPARATION THEREOF

(71) Applicants: RAYITEK Hi-Tech Film Company, Ltd., Shenzhen, Shenzhen (CN); Ohio State Innovation Foundation, Columbus, OH (US)

(72) Inventors: Karthikeyan Perumal, Columbus, OH (US); Jonathan Robert Parquette, Hilliard, OH (US); Kuppusamy Kanakarajan, Dublin, OH (US); Xi Ren, Yueyang (CN); ZhenZhong Wang, Zhuzhou (CN)

(73) Assignees: RAYITEK Hi-Tech Film Company, Ltd., Shenzhen, Shenzhen (CN); Ohio State Innovation Foundation, Columbus, OH (US)

( * ) Notice: Subject to any disclaimer, the term of this patent is extended or adjusted under 35 U.S.C. 154(b) by 581 days.

(21) Appl. No.: 16/842,074

(22) Filed: Apr. 7, 2020

(65) Prior Publication Data

US 2021/0309804 A1  Oct. 7, 2021

(51) Int. Cl.
   *C08G 73/14* (2006.01)
   *C08G 73/10* (2006.01)
   *C08J 5/18* (2006.01)
   *B29C 41/00* (2006.01)
   *B29C 41/46* (2006.01)
   *B29L 31/34* (2006.01)
   *B29K 79/00* (2006.01)
   *B29L 7/00* (2006.01)

(52) U.S. Cl.
   CPC ............ *C08G 73/14* (2013.01); *B29C 41/003* (2013.01); *B29C 41/46* (2013.01); *C08G 73/1021* (2013.01); *C08G 73/1032* (2013.01); *C08J 5/18* (2013.01); *B29K 2079/08* (2013.01); *B29K 2995/0026* (2013.01); *B29L 2007/008* (2013.01); *B29L 2031/3475* (2013.01); *C08J 2379/08* (2013.01)

(58) Field of Classification Search
   CPC .... C08G 73/1042; C08G 69/32; C08G 73/14; C08L 79/08
   See application file for complete search history.

(56) References Cited

U.S. PATENT DOCUMENTS

| | | |
|---|---|---|
| 7,550,194 B2 | 6/2009 | Simone et al. |
| 8,568,867 B2 | 10/2013 | Chan et al. |
| 2015/0011726 A1 | 1/2015 | Hasegawa et al. |
| 2017/0183462 A1 | 6/2017 | Song et al. |
| 2019/0153158 A1 | 5/2019 | Kondo et al. |

FOREIGN PATENT DOCUMENTS

JP    2018028052 A    2/2018

OTHER PUBLICATIONS

Hasegawa et al. Solution-processable colorless polyimides with ultralow coefficients of thermal expansion for optoelectronic applications, Polym Int 2016; 65: 1063-1073, Published on May 2016.*

* cited by examiner

*Primary Examiner* — Gregory Listvoyb
(74) *Attorney, Agent, or Firm* — Standley Law Group LLP; Beverly A. Marsh; Kenny W. Pung

(57) ABSTRACT

A method of preparing a colorless transparent copolyamide-imide resin solution and its fabrication as a thin film has been disclosed. The method details formulations derived from a reaction between one or more units of dianhydride and one or more units of diamine monomers with one or more of the monomers containing fluorine atoms in their structural unit. It enables the fabrication of thin films with superior thermal and mechanical properties along with co-efficient of thermal expansion values as low as 2 ppm/° C. and a tensile modulus as high as 9 GPa. The transparent copolyamide-imide film thus prepared has the potential for utilization in flexible displays such as substrates for thin film transistors (TFT), touch sensor panels (TSP) and cover window in organic light emitting diode (OLED) and liquid crystal display (LCD) applications.

12 Claims, No Drawings

COLORLESS TRANSPARENT COPOLYAMIDE-IMIDE FILMS WITH HIGH MODULUS AND LOW COEFFICIENT OF THERMAL EXPANSION AND PREPARATION THEREOF

FIELD OF INVENTION

This present invention relates to the method of preparation for colorless transparent polyimide films with a low co-efficient of thermal expansion (CTE) preferably 17 ppm/° C. or less, and a high modulus preferably 4.7 GPa or higher. The method enables the preparation of the polymer and its fabrication as a thin film by reacting one or more monomer units containing fluorine atoms and one or more monomers containing amide link that helps in realizing low CTE and a high modulus, properties of the film required for flexible display application.

BACKGROUND OF THE INVENTION

A great deal of attention has been directed towards the use of polyimides (PIs) for various optoelectronic applications such as substrates for organic photovoltaics, thin-film transistors (TFT) and touch sensor panels in organic light-emitting diodes (OLED), liquid crystal displays (LCDs), flexible printed circuit (FPCs) boards, and several other uses. Excellent mechanical and thermal stability of PIs at elevated temperatures allowed them to be the material of choice for these advanced semiconductor and optoelectronic applications. Various optoelectronic applications currently use glass as the substrate (400-700 μm thick) in their display unit fabrication. However, for flexible display applications glass substrates are very fragile; therefore, thin flexible transparent plastic films are considered as potential replacement for glass. In this context, polyimide film has attracted much attention as a viable plastic substitute to replace glass.

The essential physical and rheological properties of a polymeric/plastic substrate which would replicate the functional aspects of glass are its high optical transparency in the UV-visible wavelength, and high glass transition temperature $T_g$ required for dimensional stability at elevated temperatures for high temperature processing. Several other factors such as high elastic modulus (film ductility), low CTE, compatibility for film manufacturing process, and solvent resistance are also important in determining whether the selected polyimide is a viable alternative to the glass substrate. It should be emphasized that thermal stability, good optical transparency and good mechanical properties are critical requirements. For instance, in fabrication of active-matrix organic light-emitting diode (AMOLED) devices, the required processing temperature for TFT deposition can be higher than 300° C.

Mostly, aromatic polyimides tend to show amber or yellow color which is undesirable with respect to color and optical transparency. Coloration occurs due to charge transfer from the inter- and intramolecular interactions between the aromatic and heterocyclic rings acting as electronic charge donor-acceptors in the polymer backbone. Color can also be enhanced due to increased interchain interaction of aromatic pi-pi stacking resulting from high temperature curing. Several strategies have been adopted to circumvent this problem; the use of alicyclic monomers instead of aromatic monomer, bulky substituents to block chain-chain interactions, fluorinated substituents or other electronically deactivating substituents in the aromatic rings were used to avoid the inter- and intramolecular charge transfer interactions.

Generally, tensile modulus of conventional transparent polyimide films has been around 3.0 GPa which needs to be improved. Furthermore, solubility of the polyimides in organic solvents is preferred for the ease of film manufacturing. Commonly, polyimide films are produced by a cyclodehydration process of polyamic acid by thermal treatment. Polyamic acid solution, which is the precursor or intermediate of the polyimides, mixed with or without imidization catalysts, is coated on a substrate as a thin layer preferably by spin coating or die casting and heated uniformly. This process initiates drying and cyclodehydration with the concomitant release of water and solvent evaporation under hot condition resulting in the formation of thin polyimide film.

Several research efforts have been directed towards preparing polyimide films with low CTE and high modulus. However, reports describing the manufacturing of colorless PI films with low CTE and high modulus are rare.

U.S. Pat. No. 8,568,867B2 by Kwok Pong Chan has reported the preparation of soluble colorless PI by reacting 4,4'-diaminodiphenylsulfone (DDS) with 3,4'-oxydiphthalic dianhydride (ODPA), 3,3'-oxydiphthalic dianhydride, and/or 4,4'-oxydiphthalic dianhydride to make colorless polyimide films with a CTE of 60 ppm/° C. The reported CTE is still too high for use in flexible display substrate applications.

U.S. Pat. No. 7,550,194 by Christopher Dennis Simone has reported the use of diphenyl-3,3',4,4'-tetracarboxylic dianhydride (BPDA) and 2,2' bis(trifluoromethyl)benzidine (TFMB) monomers to prepare a polyimide film which shows a very low CTE of 3 ppm/° C. and a high modulus 929 kpsi. However, the optical transmittance of the film was 76% and the $T_g$ 252° C., both are still too low for display applications.

U.S Pat. App. No. US20170183462A1 by Sun Jin SONG reports the preparation of a colorless polyimide film with a high modulus 6.9 GPa. This was prepared from an amide oligomer made from terephthaloyl chloride (TPC) and TFMB and then further reacting with 4,4'-(hexafluoroisopropylidene)diphthalic anhydride (6FDA) and BPDA to form a polyimide solution, then polyimide precipitated, dried, and re-dissolved in a solvent to make the final polyimide film. This patent application however has not reported any CTE data.

JP2017186473A patent application by Yasutaka Kondo claims colorless polyimide film from 6FDA, BPDA and TFMB monomers with high modulus of 5.2 GPa, but they have not reported any CTE data. Regardless, the PI presented in the invention reports an optical transmittance of only 64%, not adequate for display application.

JP2018028052A by Hongyuan Wang reports a polyimide film made from TFMB and 1,2,3,4-cyclobutanetetracarboxylic dianhydride (CBDA) exhibiting low CTE of 15 ppm/° C. but its tensile modulus is not reported.

In US 20150011726A1 Hasegawa has reported the synthetic procedure for 2,2'-di(trifluoromethyl)-4,4'-di(4-aminophenylcarbonylamino)biphenyl (AB-TFMB) and 2,2'-bis(trifluoromethyl)-[1,1'-biphenyl]-4,4'-diyl bis(4-aminobenzoate) (EMBM) and also the preparation of polyimide polymer using cyclic dianhydride 1,2,4,5-cyclohexanetetracarboxylic dianhydride (H'-PMDA). The polymer is precipitated with methanol, and re-dissolved in 3% cyclopentanone solution before casting over glass substrate. The art does not include CBDA as one of the monomers. The reported CTE value of the film is 15.7 ppm/° C., modulus 3.4 GPa and transmittance at 400 nm 76%.

In another publication Polym. Int 2016; 65: 1063-1073, Hasegawa has reported ultra-low CTE value and high modulus polyimide film by using chemical imidization methods with CBDA, 6FDA and AB-TFMB. In this method, the prepared polyimide polymer is precipitated using methanol—water mixture. The precipitated solids are dried and re-dissolved in organic solvent prior to film casting. Although, a low CTE 4.2 ppm/° C., and high modulus of 7.38 GPa has been achieved, nevertheless the reported transmittance value 72.9% at 400 nm is inappreciably lower. The maximum transmittance of the thin film was reported 80%. The reported haze values, in the range below 1.5% and 3.4% are at the minimum desirable targets.

The current invention describes the polyimide synthesis procedures with a plurality of dianhydride and diamine monomers. The procedure adopted drastically improves the optical, thermal and mechanical properties of the film. A direct solution processable polyimide polymer with chemical imidization devoid of precipitation and re-dissolving methods is disclosed. There has been lots of ongoing research work for achieving high modulus and low CTE polyimide films.

SUMMARY OF THE INVENTION

The present invention discloses the procedure for the preparation of colorless polyamide-imide varnish by chemical imidization of its polyamic acid precursor which is then directly cast and processed as a thin film by drying and curing at elevated temperature. The thin films produced via this method have been shown to exhibit low CTE and high modulus values.

The method for the preparation of polyimide detailed herein employs a chemical reaction between two functionally different monomers to make the polyamic acid precursor solution. Specifically, preferred diamine monomers bear fluorine atoms and at least one diamine has an amide linkage in its molecular backbone, and at least one dianhydride monomer has an alicyclic structure. A particularly preferred combination would involve the use of two diamine monomers with one or two types of dianhydrides at varying compositions.

The diamine components include preferably a fluorine-containing aromatic diamine such as 2,2'-trifluoromethylbenzidine (TFMB) and 2,2'-di(trifluoromethyl)-4,4'-di(4-aminophenylcarbonylamino)biphenyl (AB-TFMB) and the acid dianhydride components include preferably a fluorine-containing aromatic acid dianhydride preferably 4,4'-(hexafluoroisopropylidene)diphthalic anhydride (6FDA) and one alicyclic tetracarboxylic acid dianhydride preferably 1,2,3,4-cyclobutanetetracarboxylic dianhydride (CBDA).

Many of the PI films do not show low CTE values because of their nonlinearity in their molecular structures. Some polyimides derived from aromatic diamines exhibit low CTE but show yellow color due to the intermolecular interactions between the aromatic units. The chosen AB-TFMB amide monomer has structural linearity and the potential for hydrogen bonding between amide groups is more favorable for low CTE values. Further, it contains two bulky trifluoromethyl groups that electronically deactivate and sterically hinder intermolecular stacking, which reduces the potential for charge transfer interactions. This reduces the yellow color and improves transparency.

The polyimide resin mentioned above was obtained by reacting the acid dianhydride with the diamine dissolved in a solvent to form the polyamic acid solution then chemically imidized by addition of pyridine as catalyst and acetic anhydride as dehydrating agent. This solution was applied uniformly on a substrate a technique such as spin coating or die casting followed by thermal drying/curing procedure at 300° C. or higher. The films obtained by the present invention have a low color with yellow index of less than 5.0. The CTE is 17 ppm/° C. or less, the tensile modulus is 4.7 GPa or higher, transmittance at 400 nm is 85% or greater.

DETAILED DESCRIPTION OF THE INVENTION

In the present invention, the fluorine-containing diamine, AB-TFMB, was chosen as the amide containing aromatic diamine component, the range between 10 to 90 mol %, preferably 20 to 80 mol % out of the total diamine. The preferred second diamines include fluoro group containing structural units such as 2,2'-trifluoromethylbenzidine and its ratio can vary from 10 to 90 mol % to the total diamine, preferably 20 to 80 mol %.

Content of the alicyclic acid dianhydride component in the present invention is 20 to 90 mol %. When the percentage of alicyclic acid dianhydride component was less, both CTE and mechanical strength values of the polyimide resin were undesirable. If the content of the alicyclic acid dianhydride was increased, the polyimide solubility decreased. If the alicyclic acid dianhydride was in the proposed range, excellent solubility of polymer was obtained; also, a film with superior transparency, high mechanical strength, and low CTE can be achieved. In the case of CBDA, the preferred ratio is 50 to 90 mol % in the dianhydride composition.

In the present invention, the content of fluorine containing aromatic acid dianhydride component can vary from 10 to 80 mol % of the total dianhydride. Whenever, the percentage of fluorine-containing aromatic acid dianhydride, for example, 2,2-bis (3,4-carboxyphenyl)-1,1,1,3,3,3-hexafluoropropane dianhydride becomes less, the solubility of the polyimide and transparency of the film decreases. When the percentage is increased, the CTEs become higher along with decrease of mechanical strength. When the proposed range of fluorine containing aromatic acid dianhydride is used it gives enhanced solubility for the polyimide and it gives polyimide films with excellent transparency, low CTE, and good mechanical strength.

Another important aspect of the present invention relates to the achievement of low CTEs, in the range of about 2 to about 17 ppm/° C. and high modulus, in the range of about 4.7 to about 9 GPa, of the polyimide, preferably by the use of amide containing AB-TFMB diamine unit with 10-90% and cyclic dianhydride and fluorinated dianhydride 20-80%. The reaction mixture with the preferred combination of monomers is highly soluble in organic solvents, and results in highly soluble polyamic acid resin. The chemical imidization is initiated by addition of pyridine as catalyst and acetic anhydride as a dehydrating agent. The high solubility of the resultant polyimide resin in the solvent gives a clear solution without any turbidity or solid precipitation. This resin does not require any precipitation, filtration, purification, drying, and re-dissolution in another solvent as reported in prior art. The evenness or uniformity is realized during either the solvent casting process of the preformed polyimide resin or direct solvent cast of the polyamic acid followed by thermal drying and curing at high temperature of 300° C. or higher under inert atmosphere to form the thin film.

Some examples of alicyclic dianhydride component include 1,2,3,4-cyclobutanetetracarboxylic dianhydride (CBDA), 1,2,3,4-cyclopentanetetracarboxylic dianhydride (CPDA), 1,2,4,5-cyclohexanetetracarboxylic dianhydride (H-PMDA), Dicyclohexyl-3,4,3',4'-tetracarboxylic Dianhydride (H-BPDA). 4-(2,5-Dioxotetrahydrofuran-3-yl)-1,2,3,4-tetrahydronaphthalene-1,2-dicarboxylic anhydride (TDA), 1,3-dimethyl-cyclobutane-1,2, 3,4-tetracarboxylic acid-1,2: 3,4-dianhydride (DM-CBDA), 1,2,3,4-tetramethyl-cyclobutane-1,2, 3,4-tetracarboxylic acid-1,2: 3,4-dianhydride (TM-CBDA) Norbornane-2-spiro-α-cyclopentanone-α'-spiro-2''-norbornane-5,5'',6,6''-tetracarboxylic di-anhydride (CpODA). Among these examples (CBDA) is particularly preferred.

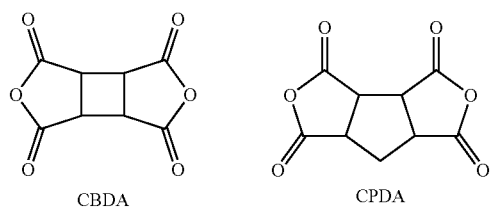

CBDA  CPDA

H-PMDA

H-BPDA

DM-CBDA

TDA

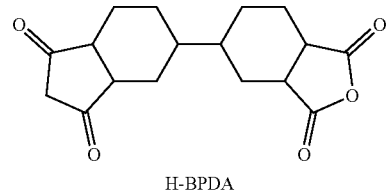

TM-CBDA  CDA

H-BTA

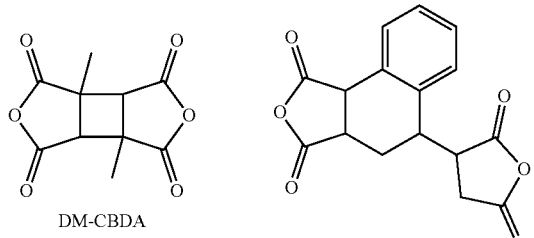

BTA

CpODA

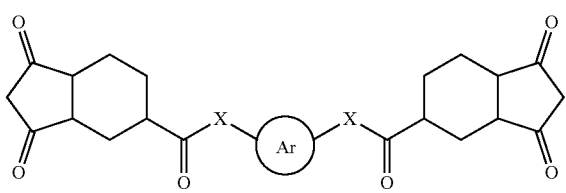

The acid dianhydride component is not limited to alicyclic acid dianhydrides for obtaining polyimides with the desired properties. Fluorine-containing aromatic acid dianhydride can be preferably used, which can also improve the transparency. Certain preferable fluorine-containing dianhydrides include 4,4'-(hexafluoroisopropylidene)diphthalic anhydride (6FDA), 2,2-bis {4-[4-(1,2-dicarboxy)phenoxy]phenyl}-1,1,1,3,3,3-hexafluoropropane dianhydride (HBDA), etc.

The polyamic acid can be prepared by any known procedure and not limited to any particular process. Equimolar quantities of diamine and di-anhydride (with the ratio ranging from about 1:1.1 to about 1:0.9) ratio are mixed together in an organic solvent and stirred at a controlled temperature to form the polyamic acid. A particular sequence of mixing monomer diamine and dianhydrides is preferred to provide high degree of polymerization. The dianhydride is preferably added to the diamine monomer contained in the reaction flask. The order of addition of the monomers in the polymerization plays a key role in the final properties of the film.

For the polymerization, solvents that do not chemically react with the monomers can be used. Particularly, aprotic solvents which dissolve the polyamic acid generated in the reaction and its polyimide are preferred. N-methyl-2-pyrrolidone (NMP), dimethylacetamide (DMAc), dimethylformamide (DMF), dimethyl sulfoxide (DMSO), γ-butyrolactone are preferred solvents. In addition, a variety of halogenated alkyl solvents, aromatic hydrocarbon solvents such as tetrahydrofuran, 1,3-toluene, 1,4-dioxane, dioxolane, p-cresol may also be used as co-solvents.

The method for preparation of polyimide from polyamic acid solution involves addition of dehydrating agent and imidization catalyst. The mode of addition of either of the additives to the polyamic solution can be interchanged but mixing dehydrant followed by catalyst is preferred. These chemicals can be added directly or dissolved individually or as a mixture in limited quantity of solvent prior to addition. The reaction mixture after the addition of these reactants can be either heated or stirred at room temperature until the imidization is nearly completed in solution. The reaction mixture can be used as such for the preparation of thin film by uniformly spreading/casting on a solid support and drying at elevated temperatures or it can be precipitated as a resin, filtered, washed, dried, and re-dissolved in another fresh solvent for casting on to the support. In some cases, the polyamic acid solution may also be cooled to a very low temperature (such as 0° C.) to mix the imidization reactants and then cast directly on a substrate as a film, then dried and cured at higher temperatures.

Some preferred catalysts for imidization include, but are not limited to pyridine, picoline, quinoline, isoquinoline, and imidazoles including 1-methyl imidazole, 1,2-dimethyl imidazole, etc. Examples of dehydrating agents include but are not limited to acetic anhydride, propionic anhydride, trifluoroacetic anhydride, benzoic anhydride, n-butyric anhydride and other aliphatic or aromatic acid anhydride. The quantity of imidization catalyst in relation to the amide group of the polyamic acid can be in the range of about 0.25 to about 10.0 molar equivalents. A preferred range would be about 2 to about 5.0 molar equivalents. The quantity of dehydrating agent with respect to the amide group of the polyamic acid is between about 2.0 to about 15.0 molar equivalents. A preferred range would be in the range of about 2.5 to about 6.0 molar equivalents.

Blending of the polyimide solution can also be undertaken with various other additives to incorporate specific functional properties to the film. Some examples may include low or high molecular weight organic compounds to improve processability, and to impart other functional aspects to the film. Other substances may include dyes, antioxidant, heat stabilizers, anti-tearing additives, glass fiber, graphene, carbon tube, inorganic fillers plasticizers, cross-linking agents, fine particles, surfactants, etc. The blended additives can be of crystalline, amorphous, fibrous or porous in nature.

The solid support upon which the polyimide film is coated can be made of glass, metal, metal-alloy, polyethylene terephthalate, and other plastic materials, or silicon materials. The solid material should be non-reactive and insoluble in the solvent used for the polyimide resin.

Depending on the nature of application, thickness of the polyimide film can be varied accordingly, and is not particularly restricted. For the preferred flexible display application, thickness can be in the range of about 2 to about 300 μm more preferably in the range of about 10 to about 200 μm.

High tensile modulus of at least 3.0 GPa or higher is believed to be required to ensure mechanical stability during the roll-on-roll manufacturing process. A tensile modulus falling in the range of about 5.0 to about 10.0 GPa is more preferred.

The present invention discloses the method of preparation of polyimide thin film more specifically using a variety of diamine and dianhydride monomers, with the concurrent realization of improved characteristics such as: a high transparency, low co-efficient of thermal expansion (CTE), high tensile modulus, and high glass transition temperature ($T_g$). These properties are suitable in utilization of these polyimide films as substrates for touch panels, TFT, and cover window in display applications.

Hereinafter, based on examples the invention will be explained more clearly. The present invention is not limited to the following examples.

Light Transmittance, b*, yellow index and Haze

The Light Transmittance, b value, yellow index and Haze of polyimide films were measured using a spectrophotometer (X-rite Ci7800), all the values were averaged.

Glass-Transition Temperature ($T_g$)

The glass-transition temperature of polyimide films were measured with method of Dynamic Mechanical Analyzer (DMA850) under the conditions of load of 0.05N, a heating rate of 3° C./min and a nitrogen atmosphere at 200° C. to 500° C., and then an inflection point of a curve with the max value was recorded as a glass-transition temperature.

The Thermal Expansion Coefficient (CTE)

The thermal expansion coefficient of polyimide films were measured two times in the range of 50~250° C. with the method of Thermomechanical Analyzer (TMA 7100C) under the conditions of a load of 20 mN, a heating rate of 10° C./min with the first scan, and a heating rate of 5° C./min with the second scan.

Mechanical Properties (Elongation, Tensile Stress, Young's Modulus)

The mechanical properties including tensile stress, elongation and Young's modulus of polyimide films were measured using an electronic universal testing machine (CMT2103) at a rate of 100 mm/min.

EXAMPLES

Example-1 (Synthesis of Polyimide)

34.0 mL of DMAc was taken in oven dried round bottomed flask (RBF) under nitrogen atmosphere. 2,2' bis (trifluoromethyl)benzidine (TFMB) (0.009 mol) and 2,2'-di (trifluoromethyl)-4,4'-di(4-aminophenylcarbonylamino) biphenyl (AB-TFMB) (0.001 mol) were added and stirred until complete dissolution. Then 4,4'-(hexafluoroisopropylidene)diphthalic anhydride (6FDA) (0.005 mol) was added in portions at regular intervals into the flask and then 1,2,3,4-cyclobutanetetracarboxylic dianhydride (CBDA) (0.005 mol) was likewise added. The reaction mixture was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. This polymer solution was cast on the glass plate and heated to 80° C. for 1 hour, semi cured film was transferred to high temperature oven and then the temperature was slowly raised to 300° C. over a period of 40 min and maintained at 300° C. for 15 min. The film was removed from the oven and cooled to room temperature then carefully peeled off from the glass plate.

Example-2 (Synthesis of Polyimide)

34.0 mL of DMAc was taken in oven dried round bottomed flask (RBF) under nitrogen atmosphere. 2,2' bis (trifluoromethyl)benzidine (TFMB) (0.008 mol) and 2,2'-di(trifluoromethyl)-4,4'-di(4-aminophenylcarbonylamino)biphenyl (AB-TFMB) (0.002 mol) were added and stirred until complete dissolution. Then 4,4'-(hexafluoroisopropylidene)diphthalic anhydride (6FDA) (0.005 mol) was added in portions at regular intervals into the flask and then 1,2,3,4-cyclobutanetetracarboxylic dianhydride (CBDA) (0.005 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate.

Example-3 (Synthesis of Polyimide)

34.0 mL of DMAc was taken in oven dried round bottomed flask (RBF) under nitrogen atmosphere. 2,2' bis(trifluoromethyl)benzidine (TFMB) (0.007 mol) and 2,2'-di(trifluoromethyl)-4,4'-di(4-aminophenylcarbonylamino)biphenyl (AB-TFMB) (0.003 mol) were added and stirred until complete dissolution. Then 4,4'-(hexafluoroisopropylidene)diphthalic anhydride (6FDA) (0.005 mol) was added in portions at regular intervals into the flask and then 1,2,3,4-cyclobutanetetracarboxylic dianhydride (CBDA) (0.005 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate.

Example-4 (Synthesis of Polyimide)

34.0 mL of DMAc was taken in oven dried round bottomed flask (RBF) under nitrogen atmosphere. 2,2' bis(trifluoromethyl)benzidine (TFMB) (0.004 mol) and 2,2'-di(trifluoromethyl)-4,4'-di(4-aminophenylcarbonylamino)biphenyl (AB-TFMB) (0.006 mol) were added and stirred until complete dissolution. Then 4,4'-(hexafluoroisopropylidene)diphthalic anhydride (6FDA) (0.005 mol) was added in portions at regular intervals into the flask and then 1,2,3,4-cyclobutanetetracarboxylic dianhydride (CBDA) (0.005 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate.

Example-5 (Synthesis of Polyimide)

34.0 mL of DMAc was taken in oven dried round bottomed flask (RBF) under nitrogen atmosphere. 2,2' bis(trifluoromethyl)benzidine (TFMB) (0.005 mol) and 2,2'-di(trifluoromethyl)-4,4'-di(4-aminophenylcarbonylamino)biphenyl (AB-TFMB) (0.005 mol) were added and stirred until complete dissolution. Then 4,4'-(hexafluoroisopropylidene)diphthalic anhydride (6FDA) (0.005 mol) was added in portions at regular intervals into the flask and then 1,2,3,4-cyclobutanetetracarboxylic dianhydride (CBDA) (0.005 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate.

Example-6 (Synthesis of Polyimide)

34.0 mL of DMAc was taken in oven dried round bottomed flask (RBF) under nitrogen atmosphere. 2,2' bis(trifluoromethyl)benzidine (TFMB) (0.004 mol) and 2,2'-di(trifluoromethyl)-4,4'-di(4-aminophenylcarbonylamino)biphenyl (AB-TFMB) (0.006 mol) were added and stirred until complete dissolution. Then 4,4'-(hexafluoroisopropylidene)diphthalic anhydride (6FDA) (0.005 mol) was added in portions at regular intervals into the flask and then 1,2,3,4-cyclobutanetetracarboxylic dianhydride (CBDA) (0.005 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate.

Example-7 (Synthesis of Polyimide)

34.0 mL of DMAc was taken in oven dried round bottomed flask (RBF) under nitrogen atmosphere. 2,2' bis(trifluoromethyl)benzidine (TFMB) (0.003 mol) and 2,2'-di(trifluoromethyl)-4,4'-di(4-aminophenylcarbonylamino)biphenyl (AB-TFMB) (0.007 mol) were added and stirred until complete dissolution. Then 4,4'-(hexafluoroisopropylidene)diphthalic anhydride (6FDA) (0.005 mol) was added in portions at regular intervals into the flask and then 1,2,3,4-cyclobutanetetracarboxylic dianhydride (CBDA) (0.005 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate.

Example-8 (Synthesis of Polyimide)

34.0 mL of DMAc was taken in oven dried round bottomed flask (RBF) under nitrogen atmosphere. 2,2' bis (trifluoromethyl)benzidine (TFMB) (0.002 mol) and 2,2'-di(trifluoromethyl)-4,4'-di(4-aminophenylcarbonylamino) biphenyl (AB-TFMB) (0.008 mol) were added and stirred until complete dissolution. Then 4,4'-(hexafluoroisopropylidene)diphthalic anhydride (6FDA) (0.005 mol) was added in portions at regular intervals into the flask and then 1,2,3,4-cyclobutanetetracarboxylic dianhydride (CBDA) (0.005 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate.

Example-9 (Synthesis of Polyimide)

34.0 mL of DMAc was taken in oven dried round bottomed flask (RBF) under nitrogen atmosphere. 2,2' bis(trifluoromethyl)benzidine (TFMB) (0.001 mol) and 2,2'-di(trifluoromethyl)-4,4'-di(4-aminophenylcarbonylamino) biphenyl (AB-TFMB) (0.009 mol) were added and stirred until complete dissolution. Then 4,4'-(hexafluoroisopropylidene)diphthalic anhydride (6FDA) (0.005 mol) was added in portions at regular intervals into the flask and then 1,2,3,4-cyclobutanetetracarboxylic dianhydride (CBDA) (0.005 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate.

Example-10 (Synthesis of Polyimide)

34.0 mL of DMAc was taken in oven dried round bottomed flask (RBF) under nitrogen atmosphere. 2,2' bis(trifluoromethyl)benzidine (TFMB) (0.002 mol) and 2,2'-di(trifluoromethyl)-4,4'-di(4-aminophenylcarbonylamino) biphenyl (AB-TFMB) (0.008 mol) were added and stirred until complete dissolution. Then 4,4'-(hexafluoroisopropylidene)diphthalic anhydride (6FDA) (0.002 mol) was added in portions at regular intervals into the flask and then 1,2,3,4-cyclobutanetetracarboxylic dianhydride (CBDA) (0.008 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate.

Comparative Example-1 (Synthesis of Polyimide)

34.0 mL of DMAc was taken in oven dried round bottomed flask (RBF) under nitrogen atmosphere. 2,2'-di(trifluoromethyl)-4,4'-di(4-aminophenylcarbonylamino)biphenyl (AB-TFMB) (0.01 mol) were added and stirred until complete dissolution. Then 4,4'-(hexafluoroisopropylidene)diphthalic anhydride (6FDA) (0.002 mol) was added in portions at regular intervals into the flask and then 1,2,3,4-cyclobutanetetracarboxylic dianhydride (CBDA) (0.008 mol) was added likewise. The reaction was stirred overnight, while monitoring the viscosity with Brookfield viscometer. Polymer was diluted to 15% wt. with. DMAc and then acetic anhydride (0.07 mol) and pyridine (0.03) were added into the polymer and left to stir overnight. At this stage, a high degree of gelation was observed. Chemical imidization process which leads to the formation of film was difficult to achieve using this procedure. Polymer solution was cast on the glass plate and heated to 80° C. for 1 hour, semi cured film was transferred to high temperature oven and then slowly raised the temperature to 300° C. over a period of 40 min and maintained at 300° C. for 1 hour. The film was removed from the oven and cooled to room temperature then carefully peeled off from the glass plate Comparative Example-2 (Synthesis of Polyimide)

34.0 mL of DMAc was taken in oven dried round bottomed flask (RBF) under nitrogen atmosphere. 2,2'-di(trifluoromethyl)-4,4'-di(4-aminophenylcarbonylamino)biphenyl (AB-TFMB) (0.01 mol) were added and stirred until complete dissolution. Then 4,4'-(hexafluoroisopropylidene)diphthalic anhydride (6FDA) (0.003 mol) was added in portions at regular intervals into the flask and then 1,2,3,4-cyclobutanetetracarboxylic dianhydride (CBDA) (0.007 mol) was added likewise. The reaction was stirred overnight, while monitoring the viscosity with Brookfield viscometer. Polymer was diluted to 15% wt. with DMAc and then acetic anhydride (0.07 mol) and pyridine (0.03) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 1 hour. The film was removed from the oven and cooled to room temperature then carefully peeled off from the glass plate.

Comparative Example-3 (Synthesis of Polyimide)

34.0 mL of DMAc was taken in oven dried round bottomed flask (RBF) under nitrogen atmosphere. 2,2' bis(trifluoromethyl)benzidine (TFMB) (0.002 mol) and 2,2'-di(trifluoromethyl)-4,4'-di(4-aminophenylcarbonylamino) biphenyl (AB-TFMB) (0.008 mol) were added and stirred until complete dissolution. Then diphenyl-3,3',4,4'-tetracarboxylic dianhydride (sBPDA) (0.002 mol) was added in portions at regular intervals into the flask and then 1,2,3,4-cyclobutanetetracarboxylic dianhydride (CBDA) (0.008 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. High gelation of the polymer was observed, and it was not possible for the chemical imidization. For the thermal curation, 15% of the polymer solution was cast on the glass plate and heated to 80° C. for 1 hour. The semi cured film was transferred to high temperature oven and then slowly raised the temperature to 300° C. over a period of 40 min and maintained at 300° C. for 15 min. The film was removed from the oven and cooled to room temperature then carefully peeled off from the glass plate, yellow index is high.

Comparative Example-4 (Synthesis of Polyimide)

34.0 mL of DMAc was taken in oven dried round bottomed flask (RBF) under nitrogen atmosphere. 2,2' bis(trifluoromethyl)benzidine (TFMB) (0.002 mol) and 2,2'-di(trifluoromethyl)-4,4'-di(4-aminophenylcarbonylamino)biphenyl (AB-TFMB) (0.008 mol) were added and stirred until complete dissolution. Then dicyclohexyl-3,4,3',4'-tetracarboxylic dianhydride (H-sBPDA) (0.002 mol) was added in portions at regular intervals into the flask and then 1,2,3,4-cyclobutanetetracarboxylic dianhydride (CBDA) (0.008 mol) was added likewise. The reaction was stirred overnight, while monitoring the viscosity with Brookfield viscometer. Based on the viscosity measurements, polymer formation did not occur, then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was brittle.

Comparative Example-5 (Synthesis of Polyimide)

34.0 mL of DMAc was taken in oven dried round bottomed flask (RBF) under nitrogen atmosphere. 2,2' bis(trifluoromethyl)benzidine (TFMB) (0.002 mol) and 2,2'-di(trifluoromethyl)-4,4'-di(4-aminophenylcarbonylamino)biphenyl (AB-TFMB) (0.008 mol) were added and stirred until complete dissolution. Then diphenyl-2,3,3',4'-tetracarboxylic dianhydride (aBPDA) (0.002 mol) was added in portions at regular intervals into the flask and then 1,2,3,4-cyclobutanetetracarboxylic dianhydride (CBDA) (0.008 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate. The film was brittle.

Comparative Example-6 (Synthesis of Polyimide)

34.0 mL of DMAc was taken in oven dried round bottomed flask (RBF) under nitrogen atmosphere. 2,2' bis(trifluoromethyl)benzidine (TFMB) (0.002 mol) and 2,2'-di(trifluoromethyl)-4,4'-di(4-aminophenylcarbonylamino)biphenyl (AB-TFMB) (0.008 mol) were added and stirred until complete dissolution. Then 1,2,4,5-cyclohexane tetracarboxylic dianhydride (H-PMDA) (0.002 mol) was added in portions at regular intervals into the flask and then 1,2,3,4-cyclobutanetetracarboxylic dianhydride (CBDA) (0.008 mol) was added likewise. The reaction was stirred overnight while monitoring the viscosity with Brookfield viscometer. Appreciable degree of polymerization failed to happen even after 72 h. Attempts to fabricate films by solution casting failed as the material turned out to be brittle.

Comparative Example-7 (Synthesis of Polyimide)

34.0 mL of DMAc was taken in oven dried round bottomed flask (RBF) under nitrogen atmosphere. 2,2' bis(trifluoromethyl)benzidine (TFMB) (0.002 mol) and 2,2'-di(trifluoromethyl)-4,4'-di(4-aminophenylcarbonylamino)biphenyl (AB-TFMB) (0.008 mol) were added and stirred until complete dissolution. Then 3,3',4,4'-benzophenonetetracarboxylic dianhydride (BTDA) (0.002 mol) was added in portions at regular intervals into the flask and then 1,2,3,4-cyclobutanetetracarboxylic dianhydride (CBDA) (0.008 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate. The film was brittle.

Comparative Example-8 (Synthesis of Polyimide)

34.0 mL of DMAc was taken in oven dried round bottomed flask (RBF) under nitrogen atmosphere. 2,2' bis(trifluoromethyl)benzidine (TFMB) (0.002 mol) and 2,2'-di(trifluoromethyl)-4,4'-di(4-aminophenylcarbonylamino)biphenyl (AB-TFMB) (0.008 mol) were added and stirred until complete dissolution. Then 9,9-bis(3,4-dicarboxyphenyl)fluorene dianhydride (BPAF) (0.002 mol) was added in portions at regular intervals into the flask and then 1,2,3,4-cyclobutanetetracarboxylic dianhydride (CBDA) (0.008 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate. The film was brittle.

Comparative Example-9 (Synthesis of Polyimide)

34.0 mL of DMAc was taken in oven dried round bottomed flask (RBF) under nitrogen atmosphere. 2,2' bis(trifluoromethyl)benzidine (TFMB) (0.002 mol) and 2,2'-di(trifluoromethyl)-4,4'-di(4-aminophenylcarbonylamino)biphenyl (AB-TFMB) (0.008 mol) were added and stirred until complete dissolution. Then Norbornane-2-spiro-α-cyclopentanone-α'-spiro-2"-norbornane-5,5",6,6"-tetracarboxylic di-anhydride (CpODA) (0.002 mol) was added in portions at regular intervals into the flask and then 1,2,3,4-cyclobutanetetracarboxylic dianhydride (CBDA) (0.008 mol) was added likewise. The reaction was stirred overnight, while monitoring the viscosity with Brookfield viscometer. Polymer was diluted to 15% wt. with DMAc and then acetic anhydride (0.025 mol) and pyridine (0.025) were added into the polymer and left to stir overnight. Polymer solution was cast on the glass plate and heated to 80° C. for 1 hour, semi cured film was transferred to high temperature oven and then slowly raised the temperature to 300° C. over a period of 40 min and maintained at 300° C. for 15 min. The film was removed from the oven and cooled to room temperature then carefully peeled off from the glass plate. The film was brittle.

| | Number | Ex.1 | Ex.2 | Ex.3 | Ex.4 | Ex.5 | Ex.6 | Ex.7 | Ex.8 | Ex.9 | Ex.10 | Com. Ex1 | Com. Ex2 | Com. Ex3 |
|---|---|---|---|---|---|---|---|---|---|---|---|---|---|---|
| Dianhydride | 6FDA | 50 | 50 | 50 | 51 | 50 | 50 | 50 | 50 | 50 | 20 | 20 | 30 | |
| | CBDA | 50 | 50 | 50 | 50 | 50 | 50 | 50 | 50 | 50 | 80 | 80 | 70 | 80 |
| | sBPDA | | | | | | | | | | | | | 20 |
| Diamine | TFMB | 90 | 80 | 70 | 60 | 50 | 40 | 30 | 20 | 10 | 20 | | | 20 |
| | AB-TFMB | 10 | 20 | 30 | 40 | 50 | 60 | 70 | 80 | 90 | 80 | 100 | 100 | 80 |
| Transmittance (%) | 400-700 nm | 89.5 | 89.3 | 88.8 | 87.8 | 88.4 | 88.2 | 85.2 | 86.3 | 86.1 | 87.4 | 82.5 | 85.0 | 83.2 |
| | 550 nm | 90.2 | 89.4 | 89.8 | 89.5 | 89.4 | 89.2 | 86.8 | 87.6 | 87.6 | 89.3 | 85.9 | 88 | 86.6 |
| Elongation (%) | | 4.6 | 11.2 | 7.2 | 4.3 | 3.6 | 16.7 | 8.11 | 3.4 | 5.1 | 3.8 | 3.2 | 15.6 | 4.2 |
| Tensile Strength (MPa) | | 136 | 162 | 171 | 123 | 137 | 194 | 176 | 144 | 170 | 228 | 122 | 169 | 139 |
| Young's modulus (GPa) | | 4.9 | 4.7 | 5.3 | 5.1 | 4.8 | 5.6 | 5.5 | 5.3 | 5.1 | 9.0 | 6.1 | 5.7 | 6.4 |
| Rth(nm, @ 10 μm) | | 464 | 583 | 524 | 622 | 607 | 660 | 667 | 548 | 596 | 970 | 541 | 472 | 106 |
| CTE (ppm/° C.; 50-300° C.) | | 17.0 | 16.3 | 10.3 | 11.6 | 8.74 | 11.3 | 14.3 | 16.0 | 16.1 | 2.0 | 21.7 | 26.6 | 2.4 |
| $T_g$ (° C.) | | 387 | 370 | 377 | 385 | 388 | 374 | 370 | 361 | 366 | 415 | 379 | 379 | — |
| b* | | 1.3 | 1.14 | 1.78 | 2.7 | 1.7 | 1.77 | 4.1 | 3.31 | 3.4 | 1.1 | 7.8 | 5.7 | 6.2 |
| Yellow index | | 2.3 | 2.0 | 3.2 | 4.8 | 3.1 | 3.2 | 4.7 | 4.0 | 4.2 | 1.9 | 12.2 | 9.8 | 11.3 |
| Haze (%) | | 0.02 | 0.22 | 0.21 | 0.45 | 0.44 | 0.08 | 0.08 | 0.12 | 0.23 | 1.6 | 3.6 | 3.7 | 0.93 |

What is claimed is:

1. A precursor solution for a polyimide, the precursor solution prepared by reacting at least two dianhydrides and at least two diamines in the presence of at least one organic solvent, wherein:
the at least two dianhydrides comprises 1,2,3,4-cyclobutanetetracarboxylic dianhydride ("CBDA") present at between 50-80 mol % of the at least two dianhydrides;
the at least two dianhydrides further comprises 4,4'-(hexafluoroisopropylidene)diphthalic anhydride ("6FDA") present at between 20-50 mol % of the at least two dianhydrides;
the at least two diamines comprises 2,2'-di(trifluoromethyl)-4,4'-di(4-aminophenylcarbonylamino) biphenyl ("AB-TFMB") present at between 10-90 mol % of the at least two diamines; and
the at least two diamines further comprises 2,2' bis (trifluoromethyl)benzidine ("TMFB") present at between 10-90 mol % of the at least two diamines.

2. The precursor solution of claim 1, wherein the organic solvent is selected from the group consisting of: N-methyl-2-pyrolidone ("NMP"), dimethyl acetamide ("DMAc"), dimethyl sulfoxide ("DMSO"), dimethylformamide ("DMF"), m-cresol, ethyl acetate, acetone and combinations thereof.

3. A polyimide film, comprising a product of the precursor solution of claim 1.

4. The polyimide film of claim 3, having each of the following features:
a co-efficient of thermal expansion (CTE) equal to or less than 17 ppm/° C.;
a Young's modulus equal to or greater than 4.7 GPa and a tensile strength equal to or greater than 120 Mpa;
a yellow index of equal to or less than 5.0;
a glass transition temperature ($T_g$) equal to or greater than 365° C.; and
a transmittance equal to or greater than 85% at 550 nm, with haze equal to or less than 1.0%.

5. A method for the manufacturing the polyimide film of claim 3, comprising:
a solution processable chemical imidization method;
a thermal imidization process; or
another imidization process.

6. The method of claim 5, wherein the chemical imidization process comprises the steps of:
mixing the precursor solution according to claim 1 with at least one catalyst and at least one dehydrant, resulting in a reactant mixture;
stirring the reactant mixture for 1 or 12 hours, obtaining a highly imidized mixture;
casting the highly imidized mixture onto a substrate, preferably a glass plate;
obtaining and producing the polyimide film by drying the casted highly imidized mixture to remove the solvent.

7. The method of claim 6, wherein the step of drying to remove the solvent is achieved at temperature in the range of about 50 to about 180° C. for a time in the range of about 8 to about 60 minutes.

8. The method of claim 6, wherein the step of obtaining and producing the polyimide film is achieved by directly heating the film at a temperature of up to 300° C.

9. The method of claim 6, wherein the at least one catalyst is selected from the group consisting of: pyridine, isoquinoline compounds, quinolone compounds, imidazole compounds, benzimidazole compounds, and combinations thereof.

10. The method of claim 9, wherein the dehydrant comprises acetic anhydride.

11. The method of claim 6, wherein the dehydrant comprises acetic anhydride.

12. A flexible display and cover window, comprising: a substrate of the polyimide film of claim 3.

* * * * *

UNITED STATES PATENT AND TRADEMARK OFFICE
CERTIFICATE OF CORRECTION

PATENT NO. : 11,827,749 B2
APPLICATION NO. : 16/842074
DATED : November 28, 2023
INVENTOR(S) : Perumal et al.

Page 1 of 1

It is certified that error appears in the above-identified patent and that said Letters Patent is hereby corrected as shown below:

In the Specification

In Columns 15 and 16, please delete the table above the claims and replace with the following:

| | Number | Ex.1 | Ex.2 | Ex.3 | Ex.4 | Ex.5 | Ex.6 | Ex.7 | Ex.8 | Ex.9 | Ex.10 | Com. Ex1 | Com. Ex2 | Com. Ex3 |
|---|---|---|---|---|---|---|---|---|---|---|---|---|---|---|
| Dianhydride | 6FDA | 50 | 50 | 50 | 50 | 50 | 50 | 50 | 50 | 50 | 20 | 20 | 30 | |
| | CBDA | 50 | 50 | 50 | 50 | 50 | 50 | 50 | 50 | 50 | 80 | 80 | 70 | 80 |
| | sBPDA | | | | | | | | | | | | | 20 |
| Diamine | TFMB | 90 | 80 | 70 | 60 | 50 | 40 | 30 | 20 | 10 | 20 | | | 20 |
| | AB-TFMB | 10 | 20 | 30 | 40 | 50 | 60 | 70 | 80 | 90 | 80 | 100 | 100 | 80 |
| Transmittance (%) | 400-700nm | 89.5 | 89.3 | 88.8 | 87.8 | 88.4 | 88.2 | 85.2 | 86.3 | 86.1 | 87.4 | 82.5 | 85.0 | 83.2 |
| | 550nm | 90.2 | 89.4 | 89.8 | 89.5 | 89.4 | 89.2 | 86.8 | 87.6 | 87.6 | 89.3 | 85.9 | 88 | 86.6 |
| Elongation (%) | | 4.6 | 11.2 | 7.2 | 4.3 | 3.6 | 16.7 | 8.11 | 3.4 | 5.1 | 3.8 | 3.2 | 15.6 | 4.2 |
| Tensile Strength (MPa) | | 136 | 162 | 171 | 123 | 137 | 194 | 176 | 144 | 170 | 228 | 122 | 169 | 139 |
| Young's modulus (GPa) | | 4.9 | 4.7 | 5.3 | 5.1 | 4.8 | 5.6 | 5.5 | 5.3 | 5.1 | 9.0 | 6.1 | 5.7 | 6.4 |
| Rth(nm, @10μm) | | 464 | 583 | 524 | 622 | 607 | 680 | 667 | 548 | 596 | 970 | 541 | 472 | 106 |
| CTE (ppm/°C; 50-300 °C) | | 17.0 | 16.3 | 10.3 | 11.6 | 8.74 | 11.3 | 14.3 | 16.0 | 16.1 | 2.0 | 21.7 | 26.6 | 2.4 |
| $T_g$(°C) | | 387 | 370 | 377 | 385 | 388 | 374 | 370 | 381 | 386 | 415 | 379 | 379 | |
| b* | | 1.3 | 1.14 | 1.78 | 2.7 | 1.7 | 1.77 | 4.1 | 3.31 | 3.4 | 1.1 | 7.8 | 5.7 | 6.2 |
| Yellow index | | 2.3 | 2.0 | 3.2 | 4.8 | 3.1 | 3.2 | 4.7 | 4.0 | 4.2 | 1.9 | 12.2 | 9.8 | 11.3 |
| Haze (%) | | 0.02 | 0.22 | 0.21 | 0.45 | 0.44 | 0.08 | 0.08 | 0.12 | 0.23 | 1.6 | 3.6 | 3.7 | 0.93 |

Signed and Sealed this
Fifteenth Day of July, 2025

Coke Morgan Stewart
*Acting Director of the United States Patent and Trademark Office*